Patented Oct. 23, 1934

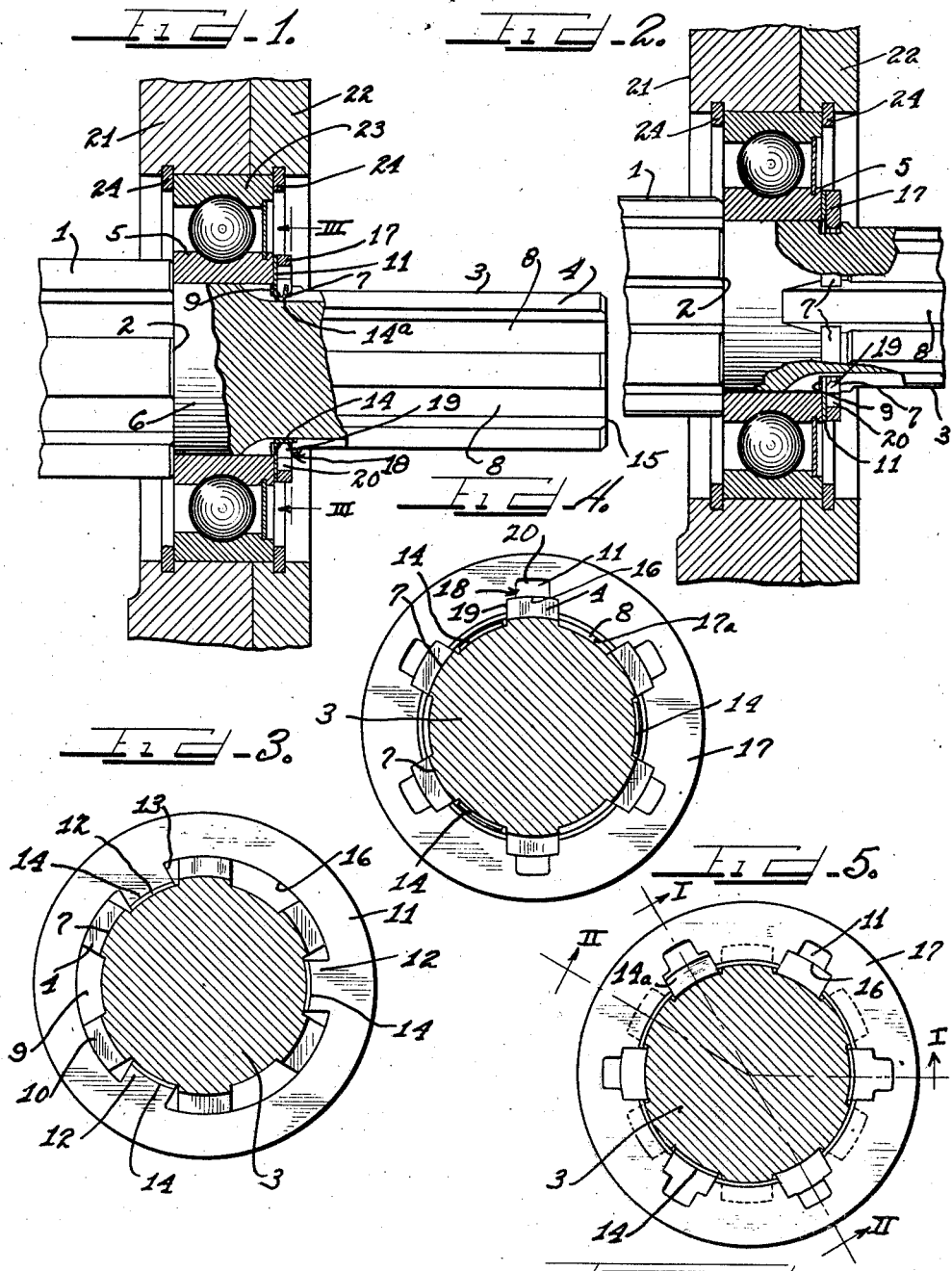

1,978,186

UNITED STATES PATENT OFFICE 1,978,186

BEARING RETAINING MEANS

John C. Buchanan, Detroit, Mich., assignor to Detroit Gear & Machine Company, Detroit, Mich., a corporation of Michigan Application July 13, 1932, Serial No. 622,249

11 Claims. (Cl. 287—53)

This invention has to do with bearings and concerns particularly an improved type of bearing retaining means.

Means of this character heretofore in vogue have been generally unsatisfactory from the standpoint of cost of manufacture and also from the standpoint of the time and effort required in placing the same in position and removing the same therefrom.

It is accordingly an object of the present invention to provide bearing retaining means, involving a low cost of manufacture.

A further object of the invention resides in the provision of instrumentalities embodying a bearing retaining device which may be readily applied to and removed from operative position.

Another object of the invention involves the provision of an improved mounting for a bearing on a shaft.

Further objects and advantages of the invention will appear as the description proceeds.

The invention contemplates generally the provision of a shouldered shaft about which is placed a roller or ball bearing, the inner ring of which is arranged to abut the shoulder of the shaft. The reduced portion of the shaft is splined in order that a sleeve such as the cam of an overrunning clutch may be drivably connected thereto, and a circumferential groove communicating with the spline grooves is located adjacent the free end of the inner ring of the bearing. A collar and washer are provided with radial portions cooperating with the spline grooves so that said parts may be readily slipped over and along the reduced splined portion of the shaft as far as inner ring of the bearing. The circumferential groove is of such construction as to allow only the collar to be turned therein, and when the collar is turned to a position where certain of its slots are in register with the radial portions of the washer, one of said portions is turned or bent into one of said slots. Thus the collar and washer are locked against movement relative to the inner ring and shaft and serve to retain said ring in position on the shaft.

Other objects and advantageous features of this invention will more fully appear from the following detailed description taken in connection which the accompanying drawing which illustrates a single embodiment thereof.

Figure 1 is a fragmentary sectional view showing certain details of the invention and taken approximately in the plane indicated by the line I—I in Figure 5, certain parts being shown in section and others in elevation.

Figure 2 is a similar view to Figure 1 but is taken approximately in the plane indicated by the line II—II in Figure 5.

Figure 3 is a transverse sectional view taken approximately in the plane indicated by the line III—III in Figure 1.

Figure 4 is a view similar to Figure 3 but showing a step in the method of assembling the retaining means.

Figure 5 is another view similar to Figure 3 but showing the retainer in a further state of assembly.

Referring now more particularly to the drawing wherein the same parts are designated throughout by the same reference characters, a shaft 1 having an end 3 is provided with splines 4 extending to a point short of the shoulder 2. The inner race or ring 5 of a ball bearing, by means of which the shaft is journalled, fits about the unsplined portion 6 of the end 3 and against the shoulder 2. The end 3 is provided with an annular groove 7, comprising in effect a circumferential or annular series of slots in the spline teeth 4. The bottoms of the slots are formed on a radius which is greater than the radius of the bottoms of the spline grooves 8, so that, when viewed in a plane as indicated by the line III—III in Figure 1 and as shown in Figures 3, 4 and 5, the shaft end portion 3 has a castellated appearance. The groove 7 is so located that the side wall 9 thereof is somewhat closer to the shoulder 2 than that end of the ring 5 which is remote from the shoulder 2.

The retaining instrumentalities include an annular flat member 11 made of any suitable material such as sheet metal and provided preferably with three equally spaced tongues 12 arranged adjacent the inner periphery 16 of the member. The tongues 12 are preferably angular, each comprising a portion 13 extending radially inward in the plane of the member and a second portion 14 extending at substantially right angles to the plane of the member and preferably curved transversely on an arc coaxial with the member. The diameter of the inner surfaces of the portions 14 is somewhat in excess of the diameter of the bottoms of the spline grooves 8, so that the member 11 may be readily slipped over the extremity 15 of the shaft 1 and along the end portion 3 until it is brought against the inner race 5 of the bearing as shown in Figures 1, 2 and 3. The innermost portion of each tongue is arranged radially inward of the bottoms of the slots of the groove 7, so that the member 11 cannot be shifted into said slots and consequently cannot rotate relative to the shaft 1. It will be observed that the diameter of the inner periphery of the member 11 at 16 is preferably slightly in excess of the maximum diameter of the splined portion of the end 3 between the groove 7 and the extremity 15, so that no obstruction to the movement of the member 11 along the end 3 to the position shown may be offered.

The retaining instrumentalities include also a washer or collar 17 provided with a circumferential series of double slots 18. Each of these slots 18 comprises a portion 19 arranged to receive a spline tooth 4, and a reduced radially outwardly extending portion 20 whose function will appear as the description proceeds. The slots 18 are arranged to correspond with the spline teeth 4, so that for each tooth 4 there is a corresponding slot 18. The diameter of the collar 17 at its inner periphery 17a is preferably somewhat in excess of the diameter of the bottoms of the slots 7 and also the outer diameter of the tongue portion 14 of the member 11, but less than the diameter of the end 3 at the outer surface of the teeth 4.

The collar 17 is applied to the end 3 by being placed over the extremity 15 with the slots 18 in alignment with the teeth 4 and then slid axially along the end 3 until the collar is brought against the annular member 11 as shown on the drawing (Figure 4). When this is done the lateral portions 14 of the tongues 12 are located in the spline grooves radially inward of the collar 17 and between the same and the shaft end portion 3 as clearly shown on the drawing, particularly Figures 1, 4 and 5. Thereupon a tool is positioned in the spline groove in which one of the tongues 12 is received, and the portion 14 of said tongue is bent away from the bottom of said groove, so that it projects into the slot 19 as shown in Figures 1 and 5. The collar is thus effectively held by the tongues projecting radially inward beyond the bottoms of the slots 7 against rotation in the slots 7, and hence the washer member 11 and the collar 17 are both held against the inner ring 5 of the bearing, removal thereof from the position shown thus being prevented.

In the event the portion 14 is bent outward to such an extent that it does not project radially inward beyond the bottom of the groove 7, the member 11 will nevertheless be held from rotation by the unbent tongue portion or portions 14.

Should it be desired for any reason to remove the bearing retaining instrumentalities 11 and 17, a tool can be inserted in the slot 20 and used as a crowbar or the like to bend the bent portion 14a of the tongue portion 14 to substantially its original condition, out of the slot 19. The collar 17 is then rotated sufficiently to bring its slots 18 in alignment with the spline teeth 4 whereupon the collar 17 is slid along the shaft end 3 and off the same. The washer member 11 can be removed by sliding the same along the end 3, either at the same time as the collar 17 or afterward.

In the illustrated embodiment of the invention, the shaft 1 is a transmission main shaft and extends through the rear wall of a transmission casing 21 and the forward wall of a free wheeling unit casing 22, these casings being suitably bolted or otherwise secured together. The end portion 3 of the shaft 1 is adapted to drivably receive one of the operative parts of a free wheeling overrunning clutch which is also associated with a tail shaft (not shown). It will be understood, of course, that the principles of the invention are applicable to mechanisms other than automotive transmissions.

The outer race or ring 23 of the bearing is preferably held in place in the casings 21 and 22 by means of split rings 24 received in grooves adjacent the ends of the ring 23.

The number of spline teeth in the end portion 3 and accordingly the number of slots in the collar 17 may be varied without departing from the principles of the invention. Likewise, the number of tongues 12 on the washer member 11 may be varied. Although only preferably one of the tongues 12 is bent to provide the interlock between the members 11 and 17, the member 17 is preferably provided with a reduced slot 20 in conjunction with each slot 19, so that no hunting is necessary when the parts are assembled to locate the reduced slot 20 in juxtaposition to the tongue to be bent. It will accordingly be seen that the task of assembling the parts 11 and 17 need consume but a few moments. The joint, it will be observed, by which the collar 17 is held in position, is of the bayonet type.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a device of the class described, a shaft having a reduced end providing a shoulder, a sleeve on said reduced end and abutting said shoulder, said reduced end having a circumferential slot one of whose walls is substantially flush with the end of the sleeve remote from the shoulder, the other wall of the slot being spaced farther from the shoulder than the first wall, the reduced end being provided with a keyway communicating with and of greater depth than said slot, a washer disposed in said slot adjacent said sleeve and having a tongue in said keyway and projecting inwardly of said slot, a collar having a projection in said slot and cooperating with said washer to substantially fill the slot transversely, said collar having a notch receiving said tongue, whereby said washer and collar are interlocked so that removal of the sleeve is prevented.

2. Retaining means comprising a shaft having an annular slot and a plurality of spline grooves of greater depth than the slot, a washer having a plurality of tongues fitting in certain of said grooves and extending radially inward of said slot whereby said washer may be slid along, but is incapable of rotation relative to, said shaft, a collar having with said washer a combined thickness substantially equal to the width of the slot, said collar having a plurality of teeth capable of sliding in said grooves and also in said slot, whereby said collar may be slid axially along said shaft and turned in said slot, one of said tongues being bent into a space between adjacent teeth of said collar when the latter is thus turned, whereby both washer and collar are interlocked against movement relative to said shaft.

3. Retaining means comprising a shaft having an annular slot and a plurality of spline grooves of greater depth than the slot, a washer having a plurality of tongues fitting in certain of said grooves and extending radially inward of said slot whereby said washer may be slid along, but is incapable of rotation relative to, said shaft, a collar having with said washer a combined thickness substantially equal to the width of the slot, said collar having a plurality of teeth capable of sliding in said grooves and also in said slot, whereby said collar may be slid axially along said shaft and turned in said slot, one of said tongues being bent into a space between adjacent teeth of said collar when the latter is thus turned whereby both washer and collar are interlocked against movement relative to said shaft, said bent tongue being spaced from the radially outer end of said space so that a tool may be inserted to bend said bent tongue out of said space when it is desired to remove said washer and collar.

4. Retaining means comprising a shaft having a circumferential slot and a plurality of longitudinal grooves of greater depth than the slot and intersecting the slot, a collar including radial projections capable of sliding in said grooves and turning in said slot whereby said collar may be slid axially along said shaft and turned in said slot, said collar also having a notch adjacent one edge thereof, and a washer including a tongue disposed in one of said longitudinal grooves and projecting into the notch in said collar for locking the collar in place.

5. In a device of the class described, a shaft having a reduced end providing a shoulder, a sleeve on said reduced end abutting said shoulder, said reduced end having a circumferential slot spaced from said shoulder, and having longitudinal grooves of greater depth than the slot and intersecting the slot, a collar including radial projections capable of sliding in said grooves and turning in said slot whereby said collar may be slid axially along said shaft and turned in said slot, said collar also having a notch adjacent one edge thereof, and a washer disposed between the collar and said sleeve and including a tongue disposed in one of said longitudinal grooves and projecting into the notch in said collar for locking the collar in place.

6. Retaining means comprising a shaft having a circumferential slot and a plurality of longitudinal grooves of greater depth than the slot and intersecting the slot, a collar including radial projections capable of sliding in said grooves and turning in said slot whereby said collar may be slid axially along said shaft and turned in said slot, said collar also having a notch adjacent one edge thereof, and a washer including a tongue disposed in one of said longitudinal grooves and projecting into the notch in said collar for locking the collar in place, said notch having its radially outer portion of less width than said tongue whereby a space is provided for the insertion of a tool for bending the tongue out of the notch when it is desired to disassemble the retaining means.

7. In a device of the class described, a shaft having a reduced end providing a shoulder, a sleeve on said reduced end abutting said shoulder, said reduced end having a circumferential slot, one of the walls of which faces and is spaced farther from the shoulder than the end of the sleeve remote from said shoulder, the reduced end being provided with a groove communicating with and of greater depth than said slot, a washer disposed in said slot adjacent said sleeve and having a tongue in said groove and projecting inwardly of said slot, a collar in said slot and having a notch receiving said tongue, whereby said washer and collar are interlocked so that removal of the sleeve is prevented.

8. Retaining means comprising a shaft having an annular slot and a plurality of spline grooves of greater depth than the slot, a washer having a plurality of tongues fitting in certain of said grooves and extending radially inward of said slot whereby said washer may slide along, but is incapable of rotation relative to, said shaft, a collar of less thickness than the width of the slot, said collar having a plurality of teeth capable of sliding in said grooves and in said slot, whereby said collar may be slid axially along said shaft and turned in said slot, one of said tongues being bent into a space between adjacent teeth of said collar when the collar is thus turned, whereby both washer and collar are interlocked against movement relative to said shaft.

9. Retaining means comprising a shaft having an annular slot and a plurality of splined grooves of greater depth than the slot, a washer having a plurality of tongues fitting in certain of said grooves and extending radially inward of said slot whereby said washer may be slid along, but is incapable of rotation relative to, said shaft, a collar of less thickness than the width of said slot, said collar having a plurality of teeth capable of sliding in said grooves and in said slot, whereby said collar may be slid axially along said shaft and turned in said slot, one of said tongues being bent into a space between adjacent teeth of said collar when the collar is thus turned, whereby both washer and collar are interlocked against movement relative to said shaft, said bent tongue being spaced from the radially outer end of said space so that a tool may be inserted to bend said bent tongue out of said space when it is desired to remove said washer and collar.

10. Retaining means comprising a shaft having a longitudinal projection provided with a transverse slot of less depth than the projection, a washer formed interiorly with a notch so as to be slidable along the shaft but incapable of rotation into the slot, a collar formed interiorly with a notch so as to be slidable along the shaft and also rotatable into the slot so that when so rotated, its notch is free of the slot, said washer having a projection fitted in the notch of the collar when the latter is so rotated, so as to prevent rotation of the collar and thereby prevent removal of the collar in the direction away from the washer, and said collar thereby, in cooperation with a wall of the slot, preventing removal of said washer in the same direction.

11. Retaining means comprising a shaft having a longitudinal projection provided with a transverse slot of less depth than the projection, a washer formed interiorly with a notch so as to be slidable along the shaft but incapable of rotation into the slot, a collar formed interiorly with a notch so as to be slidable along the shaft and also rotatable into the slot so that when so rotated, its notch is free of the slot, said washer having a yieldable projection arranged in said notch of said collar and adapted to be forcibly removed from the notch of the collar so as to enable the washer and collar to be removed from said shaft.

JOHN C. BUCHANAN.